US008092611B2

(12) United States Patent
Hatfield et al.

(10) Patent No.: US 8,092,611 B2
(45) Date of Patent: Jan. 10, 2012

(54) METHOD AND SYSTEM FOR DISHWASHER OPERATION

(75) Inventors: Edward James Hatfield, Louisville, KY (US); Mariano Pablo Filippa, Louisville, KY (US); William Hull Bicknell, Louisville, KY (US); Robert Keith Hollenbeck, Fort Wayne, IN (US)

(73) Assignee: General Electric Company, Schenectady, NY (US)

( * ) Notice: Subject to any disclaimer, the term of this patent is extended or adjusted under 35 U.S.C. 154(b) by 269 days.

(21) Appl. No.: 12/362,340

(22) Filed: Jan. 29, 2009

(65) Prior Publication Data

US 2010/0186772 A1 Jul. 29, 2010

(51) Int. Cl.
*B08B 3/00* (2006.01)

(52) U.S. Cl. ...... 134/18; 134/25.2; 134/58 D; 134/57 D; 134/56 D

(58) Field of Classification Search ............ 134/18, 134/25.2, 57 D, 56 D, 58 D
See application file for complete search history.

(56) References Cited

U.S. PATENT DOCUMENTS

| 3,279,481 | A | | 10/1966 | Sones et al. |
| 3,509,440 | A | * | 4/1970 | Johnston ............... 318/802 |
| 3,969,137 | A | | 7/1976 | Jenkins et al. |
| 4,175,575 | A | | 11/1979 | Cushing |
| 4,210,285 | A | | 7/1980 | Dicken, Jr. et al. |
| 4,509,687 | A | | 4/1985 | Cushing |
| 5,241,975 | A | * | 9/1993 | Yanagihara ............. 134/56 D |
| 5,681,401 | A | | 10/1997 | Gardner et al. |
| 5,727,581 | A | | 3/1998 | Tekriwal et al. |
| 5,810,035 | A | | 9/1998 | Tekriwal et al. |
| 5,954,073 | A | | 9/1999 | Tobbe et al. |
| 6,605,157 | B2 | | 8/2003 | Hegeman |
| 6,641,058 | B2 | | 11/2003 | Hegeman et al. |
| 6,662,814 | B2 | | 12/2003 | Tobbe et al. |
| 6,698,438 | B2 | | 3/2004 | Hegeman et al. |
| 7,100,623 | B2 | | 9/2006 | Assmann et al. |
| 2004/0173249 | A1 | | 9/2004 | Assmann et al. |
| 2005/0127865 | A1 | | 6/2005 | Kiuchi et al. |
| 2006/0237044 | A1 | | 10/2006 | Ferguson et al. |
| 2007/0006899 | A1 | | 1/2007 | Bang |
| 2007/0017556 | A1 | | 1/2007 | VanderRoest et al. |
| 2007/0068562 | A1 | | 3/2007 | Wetzel et al. |
| 2010/0139698 | A1 | * | 6/2010 | Gnadinger et al. ......... 134/25.2 |

FOREIGN PATENT DOCUMENTS

| EP | 0930044 B1 | 5/2003 |
| WO | 2005/072595 A1 | 8/2005 |
| WO | 2006-011773 A1 | 2/2006 |

* cited by examiner

*Primary Examiner* — Michael Barr
*Assistant Examiner* — Saeed T Chaudhry
(74) *Attorney, Agent, or Firm* — Global Patent Operation; Douglas D. Zhang

(57) ABSTRACT

A method, and corresponding system, for dishwasher operation including receiving an operation setting at a dishwasher to be performed by the dishwasher, where the dishwasher is configured to receive an input of electrical power at a defined operating voltage and frequency; and causing an operation of the dishwasher based on the operation setting by causing an inverter of the dishwasher to operate a pump motor of the dishwasher at an electrical power condition different from the defined operating voltage and frequency received at the dishwasher, where the electrical power condition at the pump motor causes the dishwasher to operate in accordance with a quiet dishwashing cycle, a high water pressure dishwashing cycle, a constant mass flow operation, or a minimum water use operation.

20 Claims, 7 Drawing Sheets

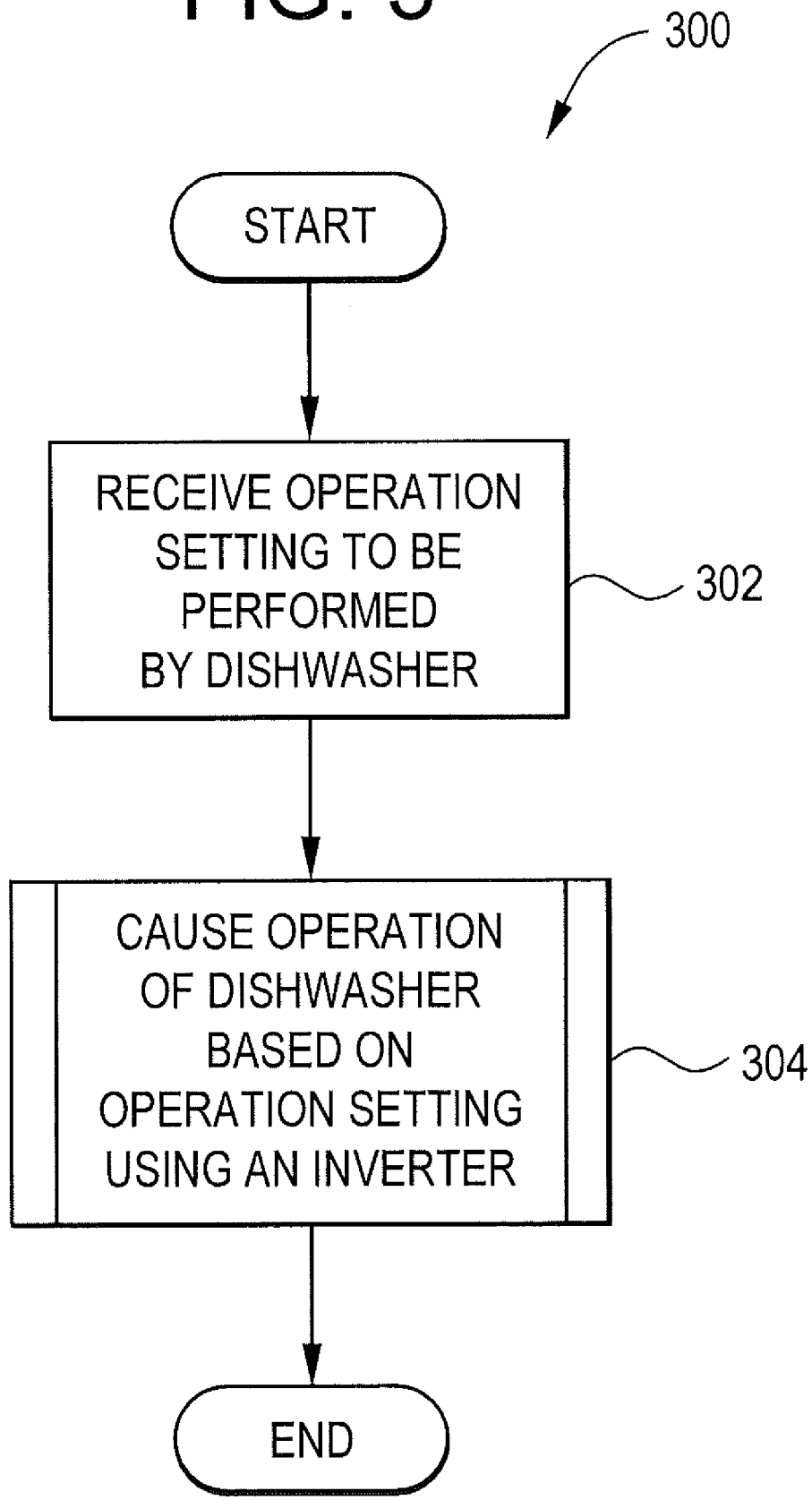

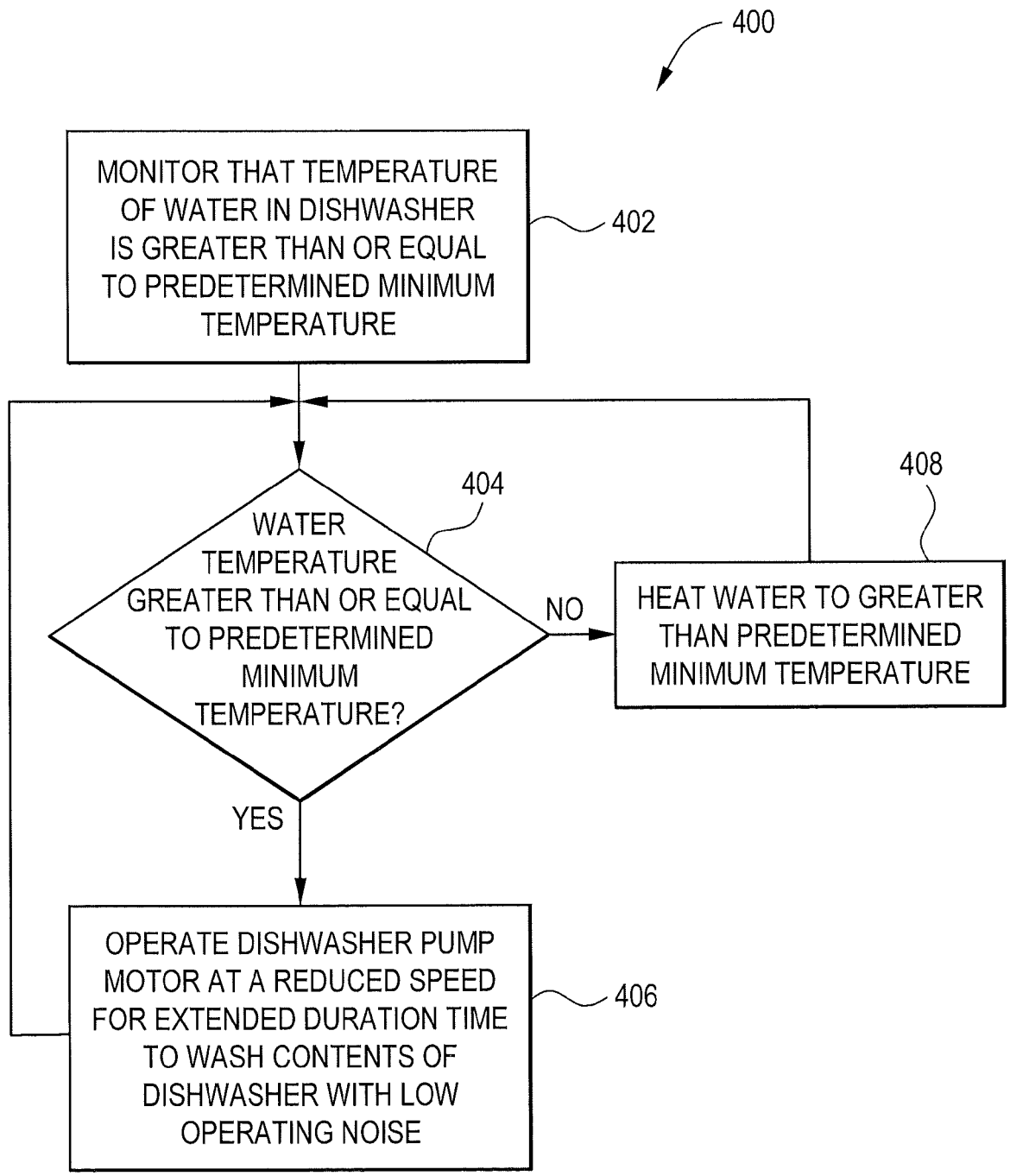

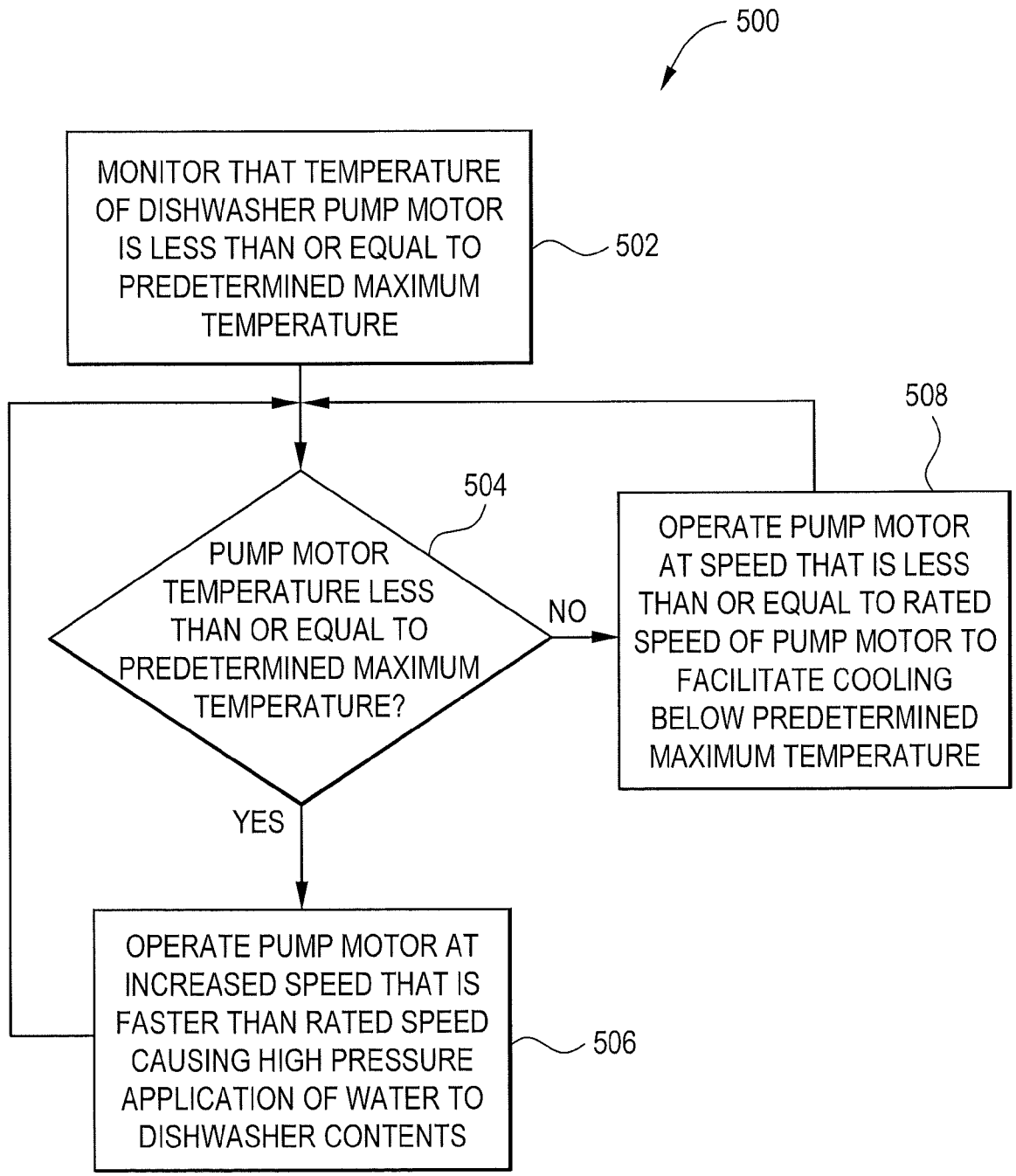

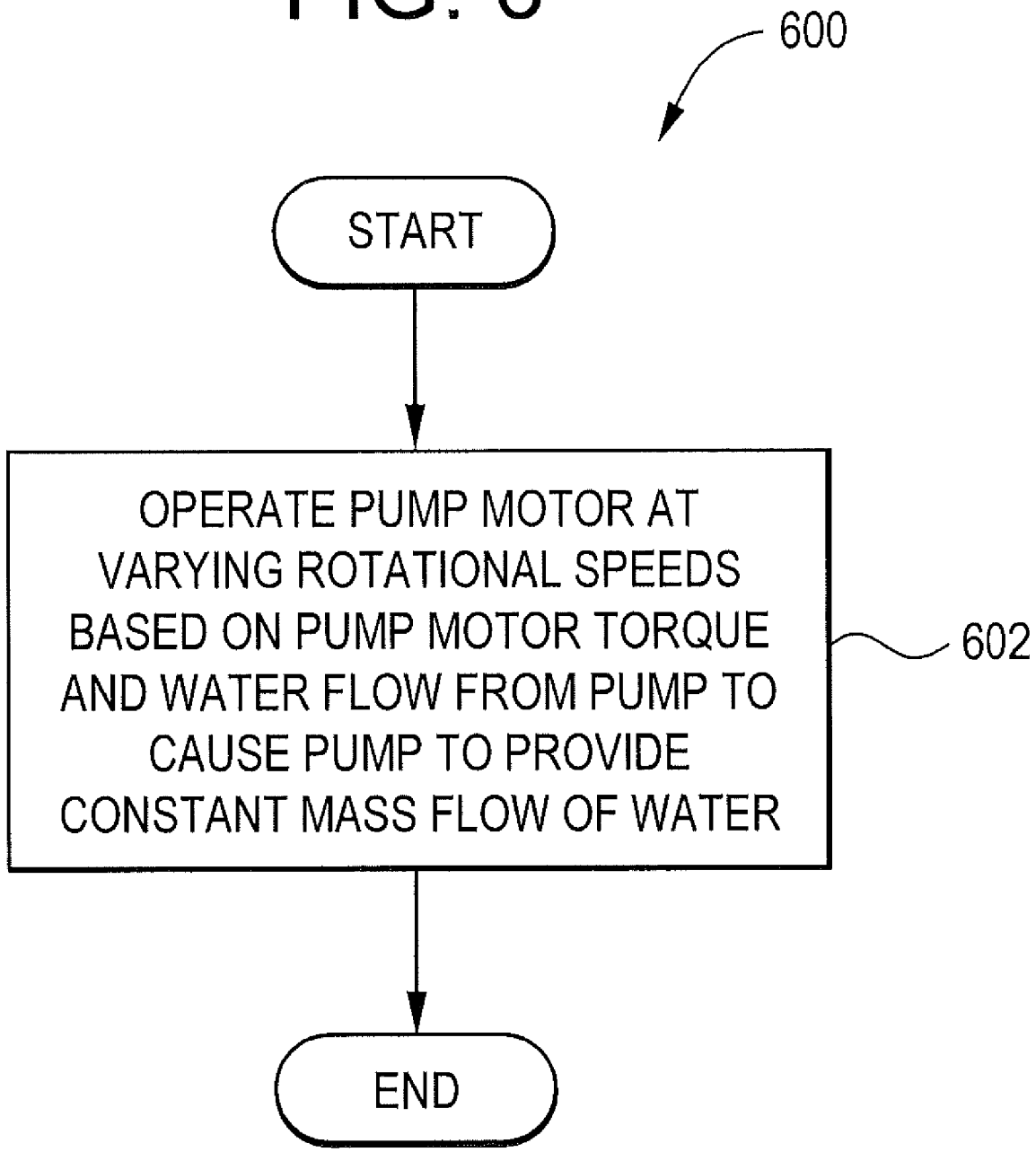

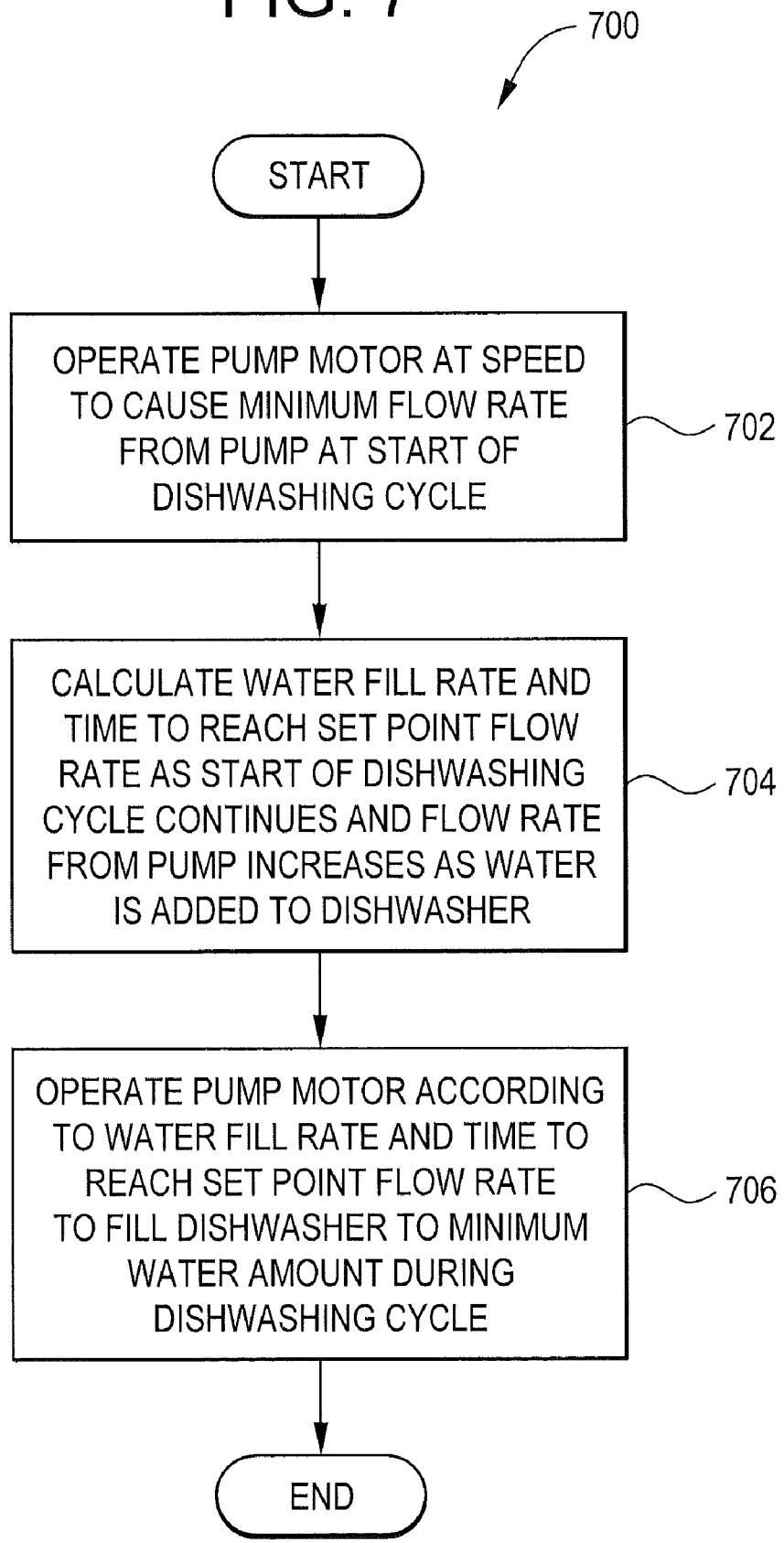

METHOD AND SYSTEM FOR DISHWASHER OPERATION

BACKGROUND

Embodiments of the invention relate generally to dishwashers, and more particularly to a method and system for dishwasher operation.

Dishwashers are utilized in various environments, particularly in residential and commercial settings. Dishwashers typically include a motor driven pump that assists with inserting, distributing, and removing water from the dishwasher interior in conjunction with other components. Increased cleaning performance is obtained through higher water pressure (e.g., applied to the dishwasher contents), which is accomplished by using larger (e.g., more powerful) pump motors. Such larger pump motors produce more operating noise and costs more than smaller pump motors. In situations when quieter operation is preferred (e.g., during sleeping hours), even smaller pump motors can cause undesirably loud operating noise. Dishwashers can also use undesirably large amounts of water during wash cycles, and the washing performance of dishwashers can be impacted by factors that affect water flow from the pump, such as power supply variations (e.g., spikes and dips), water flow resistance, low water supply, and the starting or stopping of other dishwasher components.

BRIEF DESCRIPTION

A method for dishwasher operation includes, in an exemplary embodiment, receiving an operation setting at a dishwasher to be performed by the dishwasher, where the dishwasher is configured to receive an input of electrical power at a defined operating voltage and frequency. The method further includes causing an operation of the dishwasher based on the operation setting by causing an inverter of the dishwasher to operate a pump motor of the dishwasher at an electrical power condition different from the defined operating voltage and frequency received at the dishwasher, where the electrical power condition at the pump motor causes the dishwasher to operate in accordance with a quiet dishwashing cycle, a high water pressure dishwashing cycle, a constant mass flow operation, or a minimum water use operation.

In another exemplary embodiment, a system for dishwasher operation includes a dishwasher that includes a controller in communication with an inverter in communication with a pump motor, where the dishwasher is configured to receive an input of electrical power at a defined operating voltage and frequency. The controller includes a processor responsive to computer executable instructions which when executed on the processor facilitate the controller to: 1) receive an operation setting to be performed by the dishwasher; and 2) cause an operation of the dishwasher based on the operation setting by causing the inverter of the dishwasher to operate the pump motor of the dishwasher at an electrical power condition different from the defined operating voltage and frequency received at the dishwasher, where the electrical power condition at the pump motor causes the dishwasher to operate in accordance with a quiet dishwashing cycle, a high water pressure dishwashing cycle, a constant mass flow operation, or a minimum water use operation.

BRIEF DESCRIPTION OF THE DRAWINGS

These and other features, aspects, and advantages will become better understood when the following detailed description is read with reference to the accompanying drawings in which like characters represent like parts throughout the drawings, wherein:

FIG. 3 is a flow diagram illustrating an exemplary method for dishwasher operation, which is executable, for example, by the dishwasher of FIG. 1 in accordance with exemplary embodiments of the invention.

FIG. 4 is a sub-flow diagram of the flow diagram of FIG. 3 illustrating an exemplary method for dishwasher operation including a quiet dishwashing cycle operation in accordance with exemplary embodiments of the invention.

FIG. 5 is a sub-flow diagram of the flow diagram of FIG. 3 illustrating an exemplary method for dishwasher operation including a high pressure water dishwashing cycle operation in accordance with exemplary embodiments of the invention.

FIG. 6 is a sub-flow diagram of the flow diagram of FIG. 3 illustrating an exemplary method for dishwasher operation including a high pressure water dishwashing cycle operation in accordance with exemplary embodiments of the invention.

FIG. 7 is a sub-flow diagram of the flow diagram of FIG. 3 illustrating an exemplary method for dishwasher operation including a high pressure water dishwashing cycle operation in accordance with exemplary embodiments of the invention.

DETAILED DESCRIPTION

In the following detailed description, numerous specific details are set forth in order to provide a thorough understanding of various embodiments. However, the embodiments may be practiced without these specific details. In other instances, well known methods, procedures, and components have not been described in detail.

Further, various operations may be described as multiple discrete steps performed in a manner that is helpful for understanding embodiments of the present invention. However, the order of description should not be construed as to imply that these operations need be performed in the order they are presented, or that they are even order dependent. Moreover, repeated usage of the phrase "in an embodiment" does not necessarily refer to the same embodiment, although it may. Lastly, the terms "comprising," "including," "having," and the like, as used in the present application, are intended to be synonymous unless otherwise indicated.

Exemplary embodiments of the invention provide dishwasher operation. In accordance with such exemplary embodiments, dishwasher operation can include a quiet dishwashing cycle operation (e.g., a "night wash" mode), a high pressure water dishwashing cycle operation (e.g., a "turbo wash" or "away wash" mode), a constant mass flow operation, and/or a minimum water use operation, which are performed using an inverter to operate a pump motor of the dishwasher. The quiet dishwashing cycle operation includes operating the pump motor at a reduced speed below the rated pump motor speed to provide quieter than normal operation of the dishwasher when desired (e.g., during sleeping hours). The high pressure water dishwashing cycle operation includes operating the pump motor at an increased speed above the rated pump motor speed to provide a high pressure application of water to the dishwasher contents without the use of a larger pump motor that produces more operating noise and costs more. The constant mass flow operation includes operating the pump motor at varying rotational speeds based on a torque of the pump motor and a water flow from a pump of the dishwasher driven by the pump motor to cause the pump to provide a constant mass flow of water from it. The minimum water use operation includes operating the pump motor according to a calculated water fill rate and time to reach a set point flow rate in order to fill the dishwasher to a minimum water amount during a dishwashing cycle.

Figure 1:
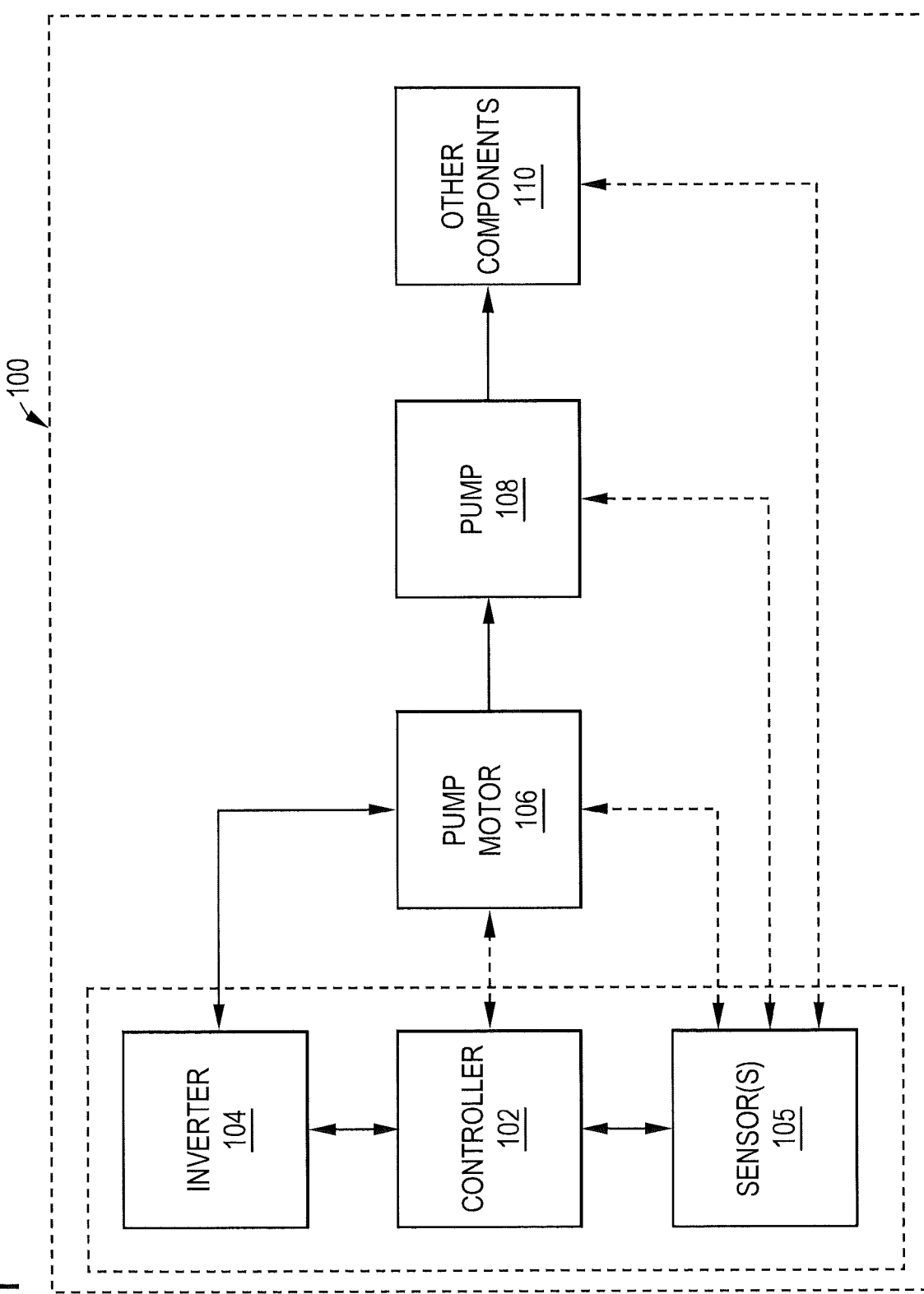
FIG. 1 is a block diagram illustrating an example of a dishwasher configured for operation in accordance with exemplary embodiments of the invention.

FIG. 1 is a block diagram illustrating an example of a dishwasher 100 configured for operation in accordance with exemplary embodiments of the invention. Dishwasher 100 includes a controller 102 in communication (e.g., electrical) with an inverter 104 that is in communication (e.g., electrical) with a pump motor 106. In some embodiments, controller 102 may also or alternately be in communication (e.g., electrical) with pump motor 106. Dishwasher 100 is configured to receive an input of electrical power at a defined operating voltage and frequency. Pump motor 106 is also in communication (e.g., mechanical) with a dishwasher pump 108 and/or other dishwasher components 110, which facilitate the operation of dishwasher 100. Controller 102 includes a processing circuit or "processor" (e.g., as described below for FIG. 2) that is responsive to computer executable instructions (e.g., as described below for FIGS. 3-7), which when executed on the processor facilitate the controller 102 to receive an operation setting for one of a quiet dishwashing cycle, a high water pressure dishwashing cycle, a constant mass flow operation, or a minimum water use operation to be performed by dishwasher 100. Controller 102 is further "facilitated" (i.e., by execution of the computer executable instructions on the processor) to cause an operation of dishwasher 100 based on the operation setting by causing the inverter 104 to operate the pump motor 106 at an electrical power condition that is different from the defined operating voltage and frequency received at the dishwasher 100. Inverter 104 may also be described as and/or include an inverter drive, a variable speed drive, an adjustable speed drive, a variable frequency drive, an adjustable frequency drive, a variable voltage variable frequency drive, etc.

Controller 102 is facilitated to cause the quiet dishwashing cycle by performing the following. The temperature of water contained in the dishwasher 100 is monitored to be greater than or equal to a predetermined minimum temperature (e.g., a temperature that is hot enough to facilitate a desired cleaning of dishwasher contents). If the temperature of the water is less than the predetermined minimum temperature, a heating of the water is caused to greater than the predetermined minimum temperature. If the temperature of the water is greater than or equal to the predetermined minimum temperature, the inverter 104 is caused to operate the pump motor 106 at a reduced speed that is slower than a normal speed that the pump motor 106 is operated at for a normal dishwashing cycle and for an extended duration time (e.g., overnight) that is longer than a duration time for the normal dishwashing cycle, to wash the contents of the dishwasher 100. The reduced speed at which the pump motor 106 is operated causes the dishwasher 100 to create less operating noise than the amount of operating noise created by the dishwasher 100 when the pump motor 106 is operated at a normal speed while thoroughly (effectively, completely, etc.) cleaning the contents of the dishwasher by application of the heated water.

In some embodiments, controller 102 is facilitated to cause the inverter 104 to operate the pump motor 106 at the reduced speed by causing the inverter 104 to input a piece wise modulated voltage and/or a piece wise modulated current to the pump motor 106 that has an equivalent (effective, cumulative, etc.) magnitude that is less than a rated magnitude of the pump motor 106 or an equivalent frequency that is less than a rated frequency of the pump motor 106. For example, controller 102 may be facilitated to cause the inverter 104 to underdrive or undermodulate pump motor 106. In other embodiments, controller 102 is further facilitated to cause the quiet dishwashing cycle by causing the inverter 104 to operate the pump motor 106 at the reduced speed to add or remove the water from the dishwasher 100 (e.g., during a fill or drain operation).

Controller 102 is facilitated to cause the high water pressure dishwashing cycle by performing the following. The temperature of the pump motor 106 is monitored to be less than or equal to a predetermined maximum temperature (e.g., the maximum rated operating temperature). If the temperature of the pump motor 106 is less than or equal to the predetermined maximum temperature, the inverter 104 is caused to operate the pump motor 106 at an increased speed that is faster than the rated speed of the pump motor. If the temperature of the pump motor 106 is greater than the predetermined maximum temperature, the inverter 104 is caused to operate the pump motor 106 at a speed that is less than or equal to the rated speed of the pump motor 106 to facilitate cooling of the pump motor 106 below the predetermined maximum temperature. The increased speed at which the pump motor 106 is operated causes a high pressure application of the water to the contents of the dishwasher 100 to thoroughly clean the contents of the dishwasher.

In some embodiments, controller 102 is facilitated to cause the inverter 104 to operate the pump motor 106 at the increased speed by causing the inverter 104 to input a piece wise modulated voltage and/or a piece wise modulated current to the pump motor 106 that has an equivalent (effective, cumulative, etc.) magnitude that is greater than a rated magnitude of the pump motor 106 or an equivalent frequency that is greater than a rated frequency of the pump motor 106. For example, controller 102 may be facilitated to cause the inverter 104 to overdrive or overmodulate pump motor 106.

Controller 102 is facilitated to cause the constant mass flow operation by causing the inverter 104 to operate the pump motor 106 at varying rotational speeds based on a torque of the pump motor 106 and a water flow from the pump 108 driven by the pump motor 106 to cause the pump 108 to provide a constant mass flow of water from it. In some embodiments, controller 102 is facilitated to cause the inverter 104 to operate the pump motor 106 to cause the pump 108 to provide a constant mass flow of water from it by causing the inverter 104 to operate the pump motor 106 according to a set of curves fit by piecewise linear lines that provide the torque of the pump motor 106 versus the rotational speed of the pump motor 106 to provide the constant mass flow operation based on operating characteristics of the pump motor 106 and the pump 108. The constant mass flow operation facilitates quiet operation of the dishwasher 100 and thorough cleaning of the dishwasher contents.

Controller 102 is facilitated to cause the minimum water use operation by performing the following. The inverter 104 is caused to operate the pump motor 106 at a speed to cause a minimum flow rate from the pump 108 by the pump motor 106 at the start of a dishwashing cycle. A water fill rate and time to reach a set point flow rate is calculated as the start of the dishwashing cycle continues and the flow rate from the pump 108 increases, as water is added to the dishwasher 100. The inverter 104 is caused to operate the pump motor 106 according to the water fill rate and the time to reach the set point flow rate to fill the dishwasher 100 to a minimum water amount during the dishwashing cycle. The minimum water use operation facilitates quiet operation of the dishwasher 100 and thorough cleaning of the dishwasher contents while using a minimum sufficient amount of water.

In some embodiments, controller 102 is further facilitated to cause the inverter 104 to operate the pump motor 106 according to the water fill rate and the time to reach the set point flow rate to maintain the minimum water amount in the dishwasher 100 during the dishwashing cycle and avoid cavitation in the pump 108. In other embodiments, controller 102 is further facilitated to cause the operation of other components 110 (such as a fill or drain valve) according to the water fill rate and the time to reach the set point flow rate to maintain the minimum water amount in the dishwasher 100 and avoid cavitation. Furthermore, in some embodiments, controller 102 may be further facilitated to calculate a maximum fill time and cause the inverter 104 to operate the pump motor 106 and/or other components 110 to prevent the dishwasher 100 from filling beyond a maximum water amount (e.g. overfilling).

In some embodiments, the inverter 104 is integrated with the controller 102 (e.g., the functions and configurations of the controller 102 and inverter 104 may be provided by a single apparatus, device, component, etc.). Furthermore, in some embodiments, dishwasher 100 also includes one or more sensors 105, such as a speed sensor, an electrical current sensor, a torque sensor, a water level sensor, a flow sensor, etc., in communication with controller 102, pump motor 106, pump 108, and/or other components 110. In such embodiments, the controller 102 is further facilitated to cause the dishwasher operation described herein by also monitoring the sensor(s) 105 and using information transmitted from them for the dishwasher operation. Furthermore, in some embodiments, the sensor(s) 105 are integrated with the controller 102 and/or the inverter 104.

Figure 2:
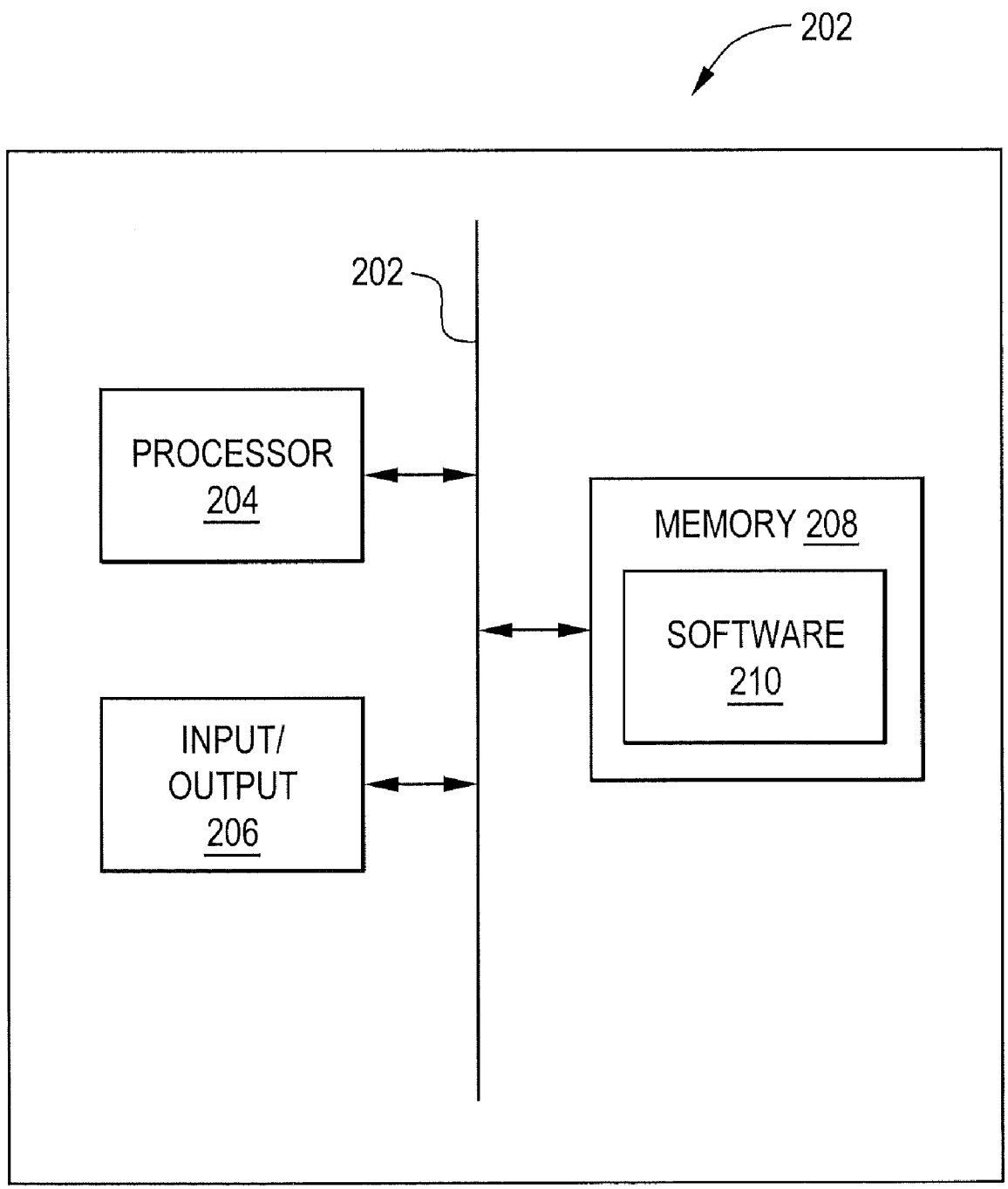
FIG. 2 is a block diagram illustrating an exemplary configuration of a controller of the dishwasher of FIG. 1 configured to cause dishwasher operation in accordance with exemplary embodiments of the invention.

FIG. 2 is a block diagram illustrating an exemplary configuration of the controller 102 of the dishwasher 106 of FIG. 1 that is configured to cause dishwasher operation in accordance with exemplary embodiments of the invention. In this regard, the controller 102 may have a similar configuration to a computer or computing device. Exemplary controller 102 includes a processor 204, input/output component(s) 206, and memory 208, which are in communication via a bus 202. Input/output component(s) 206 may include one or more components that facilitate local and/or remote input/output operations to/from controller 102, such as a display, keyboard, modem, network adapter, ports, etc. (not depicted). Memory 208 includes software 210 configured to provide dishwasher operation, which is executable, e.g., by controller 102 via processor 204. Memory 208 may also include other software, data, etc.

FIG. 3 is a flow diagram illustrating an exemplary method 300 for dishwasher operation, which is executable, for example, by the dishwasher 100 of FIG. 1 (e.g., as a computer program product) in accordance with exemplary embodiments of the invention. Exemplary method 300 may also describe an exemplary operation of dishwasher 100 to provide dishwasher operation in accordance with the above descriptions for FIGS. 1 and 2. In block 302, an operation setting is received for one of a quiet dishwashing cycle, a high water pressure dishwashing cycle, a constant mass flow operation, or a minimum water use operation to be performed by a dishwasher. In block 304, an operation of the dishwasher is caused based on the operation setting by causing an inverter to operate a pump motor 106 of the dishwasher. The quiet dishwashing cycle operation of the dishwasher is further described below with respect to FIG. 4. The high water pressure dishwashing cycle is further described below with respect to FIG. 5. The constant mass flow operation is further described below with respect to FIG. 6. The minimum water use operation is further described below with respect to FIG. 7.

FIG. 4 is a sub-flow diagram of the flow diagram of FIG. 3 illustrating an exemplary method 400 for dishwasher operation (i.e., corresponding to block 304 of FIG. 3) including a quiet dishwashing cycle operation in accordance with exemplary embodiments of the invention. Exemplary method 400 may also describe an exemplary operation of dishwasher 100 to provide a quiet dishwashing cycle operation in accordance with the above descriptions for FIGS. 1 and 2. In block 402, the temperature of water contained in the dishwasher is monitored to be greater than or equal to a predetermined minimum temperature. In block 404, if the temperature of water contained in the dishwasher is greater than or equal to the predetermined minimum temperature, method 400 proceeds to block 406 in which a pump motor of the dishwasher is operated at a reduced speed for an extended duration time causing low operating noise while thoroughly cleaning the dishwasher contents (e.g., as further described above for FIG. 1). In block 404, if the temperature of water contained in the dishwasher is less than the predetermined minimum temperature, method 400 proceeds to block 408 in which the water in the dishwasher is heated to greater than the predetermined minimum temperature (e.g., as further described above for FIG. 1).

In some embodiments, operating the pump motor of the dishwasher at the reduced speed in block 406 includes inputting a piece wise modulated voltage and/or a piece wise modulated current to the pump motor that has an equivalent magnitude that is less than a rated magnitude of the pump motor or an equivalent frequency that is less than a rated frequency of the pump motor. For example, the inverter may be caused to underdrive or undermodulate the pump motor. In other embodiments, the quiet dishwashing cycle operation of method 306 further includes operating the pump motor at the reduced speed to add or remove the water from the dishwasher.

FIG. 5 is a sub-flow diagram of the flow diagram of FIG. 3 illustrating an exemplary method 500 for dishwasher operation (i.e., corresponding to block 304 of FIG. 3) including a high pressure water dishwashing cycle operation in accordance with exemplary embodiments of the invention. Exemplary method 500 may also describe an exemplary operation of dishwasher 100 to provide a high pressure water dishwashing cycle operation in accordance with the above descriptions for FIGS. 1 and 2. In block 502, the temperature of a dishwasher pump motor is monitored to be less than or equal to a predetermined maximum temperature. In block 504, if the temperature of the pump motor is less than or equal to the predetermined maximum temperature, method 500 proceeds to block 506 in which a pump motor of the dishwasher is operated at an increased speed that is faster than the rated speed of the pump motor to cause a high pressure application of water to the dishwasher contents to thoroughly clean the dishwasher contents (e.g., as further described above for FIG. 1). In block 504, if the temperature of the pump motor is greater than the predetermined maximum temperature, method 500 proceeds to block 508 in which the pump motor is operated at a speed that is less than or equal to the rated speed of the pump motor to facilitate cooling of the pump motor below the predetermined maximum temperature (e.g., as further described above for FIG. 1).

In some embodiments, operating the pump motor of the dishwasher at an increased speed in block 506 includes inputting a piece wise modulated voltage and/or a piece wise modulated current to the pump motor that has an equivalent magnitude that is greater than a rated magnitude of the pump motor or an equivalent frequency that is greater than a rated frequency of the pump motor. For example, the inverter may be caused to overdrive or overmodulate the pump motor.

FIG. 6 is a sub-flow diagram of the flow diagram of FIG. 3 illustrating an exemplary method 600 for dishwasher operation (i.e., corresponding to block 304 of FIG. 3) including a constant mass flow operation in accordance with exemplary embodiments of the invention. Exemplary method 600 may also describe an exemplary operation of dishwasher 100 to provide a constant mass flow operation in accordance with the above descriptions for FIGS. 1 and 2. In block 602, the pump motor is operated at varying rotational speeds based on a torque of the pump motor and a water flow from a pump of the dishwasher driven by the pump motor to cause the pump to provide a constant mass flow of water from it. In some embodiments, operating the pump motor to cause the pump to provide a constant mass flow of water from it includes operating the pump motor according to a set of curves fit by piecewise linear lines that provide the torque of the pump motor versus the rotational speed of the pump motor to provide the constant mass flow operation based on operating characteristics of the pump motor and the pump.

FIG. 7 is a sub-flow diagram of the flow diagram of FIG. 7 illustrating an exemplary method 700 for dishwasher operation (i.e., corresponding to block 304 of FIG. 3) including a minimum water use operation in accordance with exemplary embodiments of the invention. Exemplary method 700 may also describe an exemplary operation of dishwasher 100 to provide a minimum water use operation in accordance with the above descriptions for FIGS. 1 and 2. In block 702, the pump motor is operated at a speed to cause a minimum flow rate from a pump of the dishwasher driven by the pump motor at a start of a dishwashing cycle. In block 704, a water fill rate and a time to reach a set point flow rate is calculated as the start of the dishwashing cycle continues and the flow rate from the pump increases as water is added to the dishwasher. In block 706, the pump motor is operated according to the water fill rate and the time to reach the set point flow rate to fill the dishwasher to a minimum water amount during the dishwashing cycle. In some embodiments, the pump motor is further operated according to the water fill rate and the time to reach the set point flow rate in order to maintain the minimum water amount in the dishwasher during the dishwashing cycle and avoid cavitation in the pump.

Thus, the technical effect of exemplary embodiments of the invention is dishwasher operation. This dishwasher operation can include a quiet dishwashing cycle operation (e.g., a "night wash" mode), a high pressure water dishwashing cycle operation (e.g., a "turbo wash" or "away wash" mode), a constant mass flow operation, and/or a minimum water use operation, which are performed using an inverter to operate a pump motor of the dishwasher. The quiet dishwashing cycle operation includes operating the pump motor at a reduced speed below the rated pump motor speed to provide quieter than normal operation of the dishwasher when desired (e.g., during sleeping hours). The high pressure water dishwashing cycle operation includes operating the pump motor at an increased speed above the rated pump motor speed to provide a high pressure application of water to the dishwasher contents without the use of a larger pump motor that produces more operating noise and costs more. The constant mass flow operation includes operating the pump motor at varying rotational speeds based on a torque of the pump motor and a water flow from a pump of the dishwasher driven by the pump motor to cause the pump to provide a constant mass flow of water from it. The minimum water use operation includes operating the pump motor according to a calculated water fill rate and time to reach a set point flow rate in order to fill the dishwasher to a minimum water amount during a dishwashing cycle.

The flowchart and/or block diagram(s) in the figure(s) described herein illustrate the architecture, functionality, and/or operation of possible implementations of systems, methods, and/or computer program products according to various exemplary embodiments of the invention. In this regard, each block in a flowchart or block diagram may represent a module, segment, or portion of code, which includes one or more executable instructions for implementing the specified logical function(s). It should also be noted that, in some alternative implementations, the functions noted in a flowchart or block diagram may occur out of the order noted in the figure(s). For example, two blocks shown in succession may, in some embodiments, be executed substantially concurrently, or the blocks may sometimes be executed in the reverse order, depending upon the functionality involved. It is also noted that each block of the block diagrams and/or flowchart illustration, and combinations of blocks in a flowchart or block diagram, may be implemented by special purpose hardware-based systems that perform the specified functions or acts, or combinations of special purpose hardware and computer instructions.

This written description uses examples to disclose the invention, including the best mode, and also to enable practice of the invention, including making and using any devices or systems and performing any incorporated methods. The patentable scope of the invention is defined by the claims, and may include other examples. Such other examples are intended to be within the scope of the claims if they have structural elements that do not differ from the literal language of the claims, or if they include equivalent structural elements with insubstantial differences from the literal languages of the claims.

What is claimed is:

1. A method for dishwasher operation, comprising:
    receiving an operation setting at a dishwasher to be performed by the dishwasher, the dishwasher being configured to receive an input of electrical power at a defined operating voltage and frequency; and
    causing an operation of the dishwasher based on the operation setting by causing an inverter of the dishwasher to operate a pump motor of the dishwasher at an electrical power condition different from the defined operating voltage and frequency received at the dishwasher, the electrical power condition at the pump motor causing the dishwasher to operate in accordance with one of a quiet dishwashing cycle, a high water pressure dishwashing cycle, a constant mass flow operation, or a minimum water use operation.

2. The method of claim 1, wherein causing the quiet dishwashing cycle comprises:
    monitoring that a temperature of water contained in the dishwasher is greater than or equal to a predetermined minimum temperature;
    if the temperature of the water is less than the predetermined minimum temperature, heating the water to greater than the predetermined minimum temperature; and
    if the temperature of the water is greater than or equal to the predetermined minimum temperature, operating the pump motor at a reduced speed that is slower than a normal speed that the pump motor is operated at for a normal dishwashing cycle, and for an extended duration time that is longer than a duration time for the normal dishwashing cycle, to wash contents of the dishwasher.

3. The method of claim 2, wherein operating the pump motor at the reduced speed includes inputting one of a piece wise modulated voltage or a piece wise modulated current to the pump motor having an equivalent magnitude that is less than a rated magnitude of the pump motor, or an equivalent frequency that is less than a rated frequency of the pump motor.

4. The method of claim 2, wherein causing the quiet dishwashing cycle further comprises operating the pump motor at the reduced speed to add the water to the dishwasher or remove the water from the dishwasher.

5. The method of claim 1, wherein causing the high water pressure dishwashing cycle comprises:
   monitoring that a temperature of the pump motor is less than or equal to a predetermined maximum temperature;
   if the temperature of the pump motor is less than or equal to the predetermined maximum temperature, operating the pump motor at an increased speed that is faster than a rated speed of the pump motor; and
   if the temperature of the pump motor is greater than the predetermined maximum temperature, operating the pump motor at a speed that is less than or equal to the rated speed of the pump motor to facilitate a cooling of the pump motor below the predetermined maximum temperature.

6. The method of claim 5, wherein operating the pump motor at an increased speed includes inputting one of a piece wise modulated voltage or a piece wise modulated current to the pump motor having an equivalent magnitude that is greater than a rated magnitude of the pump motor or an equivalent frequency that is greater than a rated frequency of the pump motor.

7. The method of claim 1, wherein causing the constant mass flow operation comprises operating the pump motor at varying rotational speeds based on a torque of the pump motor and a water flow from a pump of the dishwasher driven by the pump motor to cause the pump to provide a constant mass flow of water from it.

8. The method of claim 7, wherein operating the pump motor to cause the pump to provide a constant mass flow of water from it comprises operating the pump motor according to a set of curves fit by piecewise linear lines that provide the torque of the pump motor versus the rotational speed of the pump motor to provide the constant mass flow operation based on operating characteristics of the pump motor and the pump.

9. The method of claim 1, wherein causing the minimum water use operation comprises:
   operating the pump motor at a speed to cause a minimum flow rate from a pump of the dishwasher driven by the pump motor at a start of a dishwashing cycle;
   calculating a water fill rate and a time to reach a set point flow rate as the start of the dishwashing cycle continues and the flow rate from the pump increases as water is added to the dishwasher;
   operating the pump motor according to the water fill rate and the time to reach the set point flow rate to fill the dishwasher to a minimum water amount during the dishwashing cycle.

10. The method of claim 9, further comprising operating the pump motor according to the water fill rate and the time to reach the set point flow rate to maintain the minimum water amount in the dishwasher during the dishwashing cycle and avoid cavitation in the pump.

11. A system for dishwasher operation, comprising a dishwasher that includes a controller in communication with an inverter in communication with a pump motor, the dishwasher being configured to receive an input of electrical power at a defined operating voltage and frequency, and the controller including a processor responsive to computer executable instructions which when executed on the processor facilitate the controller to:
   receive an operation setting to be performed by the dishwasher; and
   cause an operation of the dishwasher based on the operation setting by causing the inverter of the dishwasher to operate the pump motor of the dishwasher at an electrical power condition different from the defined operating voltage and frequency received at the dishwasher, the electrical power condition at the pump motor causing the dishwasher to operate in accordance with one of a quiet dishwashing cycle, a high water pressure dishwashing cycle, a constant mass flow operation, or a minimum water use operation.

12. The system of claim 11, wherein the controller is facilitated to cause the quiet dishwashing cycle by:
   monitoring that a temperature of water contained in the dishwasher is greater than or equal to a predetermined minimum temperature;
   if the temperature of the water is less than the predetermined minimum temperature, causing a heating of the water to greater than the predetermined minimum temperature; and
   if the temperature of the water is greater than or equal to the predetermined minimum temperature, causing the inverter to operate the pump motor at a reduced speed that is slower than a normal speed that the pump motor is operated at for a normal dishwashing cycle, and for an extended duration time that is longer than a duration time for the normal dishwashing cycle, to wash contents of the dishwasher.

13. The system of claim 12, wherein the controller is facilitated to cause the inverter to operate the pump motor at the reduced speed by causing the inverter to input one of a piece wise modulated voltage or a piece wise modulated current to the pump motor having an equivalent magnitude that is less than a rated magnitude of the pump motor, or an equivalent frequency that is less than a rated frequency of the pump motor.

14. The system of claim 12, wherein the controller is further facilitated to cause the quiet dishwashing cycle by causing the inverter to operate the pump motor at the reduced speed to add the water to the dishwasher or remove the water from the dishwasher.

15. The system of claim 11, wherein the controller is facilitated to cause the high water pressure dishwashing cycle by:
   monitoring that a temperature of the pump motor is less than or equal to a predetermined maximum temperature;
   if the temperature of the pump motor is less than or equal to the predetermined maximum temperature, causing the inverter to operate the pump motor at an increased speed that is faster than a rated speed of the pump motor; and
   if the temperature of the pump motor is greater than the predetermined maximum temperature, causing the inverter to operate the pump motor at a speed that is less than or equal to the rated speed of the pump motor to facilitate a cooling of the pump motor below the predetermined maximum temperature.

16. The system of claim 15, wherein the controller is facilitated to cause the inverter to operate the pump motor at the increased speed by causing the inverter to input one of a piece wise modulated voltage or a piece wise modulated current to the pump motor having an equivalent magnitude that is greater than a rated magnitude of the pump motor or an equivalent frequency that is greater than a rated frequency of the pump motor.

17. The system of claim 11, wherein the controller is facilitated to cause the constant mass flow operation by causing the inverter to operate the pump motor at varying rotational speeds based on a torque of the pump motor and a water flow from a pump of the dishwasher driven by the pump motor to cause the pump to provide a constant mass flow of water from it.

18. The system of claim 17, wherein the controller is facilitated to cause the inverter to operate the pump motor to cause the pump to provide a constant mass flow of water from it by causing the inverter to operate the pump motor according to a set of curves fit by piecewise linear lines that provide the torque of the pump motor versus the rotational speed of the pump motor to provide the constant mass flow operation based on operating characteristics of the pump motor and the pump.

19. The system of claim 11, wherein the controller is facilitated to cause the minimum water use operation by:
   causing the inverter to operate the pump motor at a speed to cause a minimum flow rate from a pump of the dishwasher driven by the pump motor at a start of a dishwashing cycle;
   calculating a water fill rate and a time to reach a set point flow rate as the start of the dishwashing cycle continues and the flow rate from the pump increases as water is added to the dishwasher;
   causing the inverter to operate the pump motor according to the water fill rate and the time to reach the set point flow rate to fill the dishwasher to a minimum water amount during the dishwashing cycle.

20. The system of claim 19, wherein the controller is further facilitated to cause the inverter to operate the pump motor according to the water fill rate and the time to reach the set point flow rate to maintain the minimum water amount in the dishwasher during the dishwashing cycle and avoid cavitation in the pump.

* * * * *